United States Patent
Miyata et al.

[11] Patent Number: 5,863,458
[45] Date of Patent: Jan. 26, 1999

[54] LIQUID CRYSTAL APPARATUS AND DISPLAY APPARATUS

[75] Inventors: Hirokatsu Miyata, Hadano; Hiroyuki Kitayama, Isehara; Hirohide Munakata, Yokohama; Shinjiro Okada; Katsuhiko Shinjo, both of Isehara; Tomoko Maruyama, Atsugi, all of Japan

[73] Assignee: Canon Kabushiki Kaisha, Tokyo, Japan

[21] Appl. No.: 754,674

[22] Filed: Nov. 21, 1996

[30] Foreign Application Priority Data

Nov. 22, 1995 [JP] Japan .................................. 7-304456

[51] Int. Cl.$^6$ ........................... C09K 19/52; G02F 1/135; G09G 3/36
[52] U.S. Cl. ......................... 252/299.01; 345/97; 345/98; 348/792; 349/54; 349/123; 349/129; 349/134
[58] Field of Search .......................... 252/299.01, 299.4; 349/123, 133, 129, 134, 54, 172; 428/1; 345/94, 97, 98; 348/792, 790

[56] References Cited

U.S. PATENT DOCUMENTS

| | | | |
|---|---|---|---|
| 4,712,877 | 12/1987 | Okada et al. | 350/350 S |
| 4,712,878 | 12/1987 | Taniguchi et al. | 350/350 S |
| 4,778,259 | 10/1988 | Kitayama et al. | 350/350 S |
| 4,898,456 | 2/1990 | Okada et al. | 350/350 S |
| 4,941,736 | 7/1990 | Taniguchi et al. | 350/350 S |
| 5,078,477 | 1/1992 | Jono et al. | 359/91 |
| 5,082,587 | 1/1992 | Janulis | 252/299.01 |
| 5,260,817 | 11/1993 | Kaneko et al. | 359/56 |
| 5,500,749 | 3/1996 | Inaba et al. | 359/56 |
| 5,530,569 | 6/1996 | Tsuboyama et al. | 359/56 |
| 5,641,427 | 6/1997 | Shinjo et al. | 252/299.01 |
| 5,688,437 | 11/1997 | Sato et al. | 252/299.61 |
| 5,790,449 | 8/1998 | Kanbe et al. | 345/97 |

FOREIGN PATENT DOCUMENTS

| | | |
|---|---|---|
| 2-142753 | 5/1990 | Japan . |
| WO 93/022396 | 11/1993 | WIPO . |

OTHER PUBLICATIONS

Proceedings of the 3rd International Topical Meeting on the Optics of Liquid Crystals, Molecular Crystals and Liquid Crystals, vol. 207(1991) p. 287.

Y. Ouchi et al., Japanese Journal of Applied Physics, vol. 27, No. 45, May 1988, pp. L725–L728.

N.A. Clark et al., Proceedings of the 6th International Display Research Conference, Japan Display '86, Sep. 30–Oct. 2, 1986, Tokyo, pp. 456–458.

K. Miyasato et al., Japanese Journal of Applied Physics, V. 22, No. 10, Oct. 1983, pp. L661–L663.

Primary Examiner—Shean C. Wu
Attorney, Agent, or Firm—Fitzpatrick, Cella, Harper & Scinto

[57] ABSTRACT

A liquid crystal apparatus includes a liquid crystal panel and drive means for driving the liquid crystal panel. The liquid crystal panel includes a pair of oppositely disposed substrates each having an electrode thereon, an alignment film disposed over the electrode on at least one of the substrates, and a liquid crystal disposed between the substrates; the liquid crystal being composed of a plurality of liquid crystal layers each composed of a plurality of liquid crystal molecules. The drive means is suitable for applying to the liquid crystal an electric field insufficient to cause a switching of the liquid crystal but sufficient to cause a reversible change of the liquid crystal layers into a bookshelf structure. As a result, the liquid crystal panel can be provided with a good switching characteristic while effectively suppressing deleterious liquid crystal molecular movement.

17 Claims, 10 Drawing Sheets

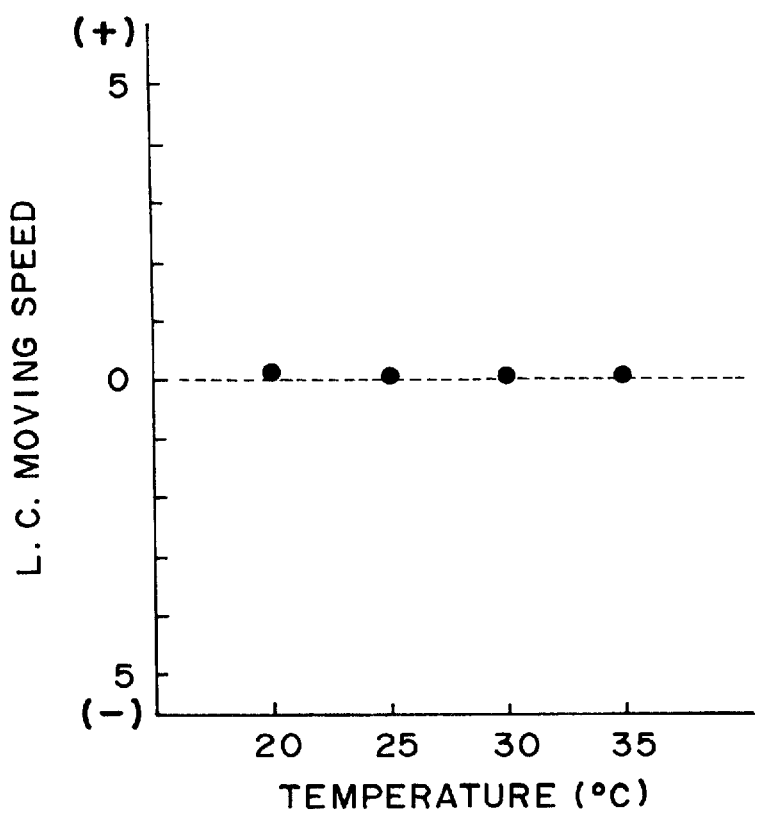
F I G. 6

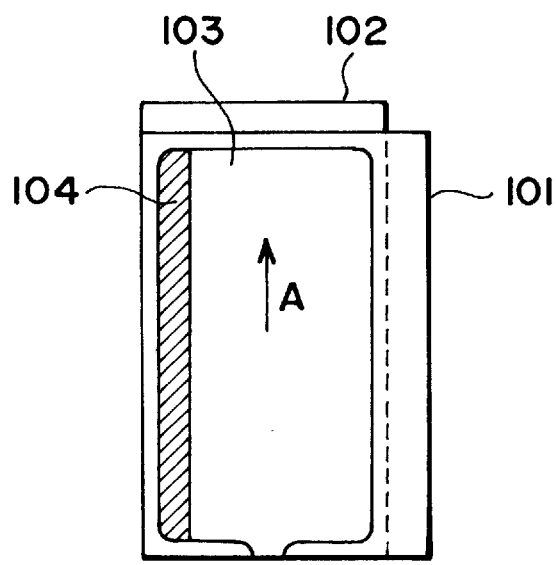
F I G. 10
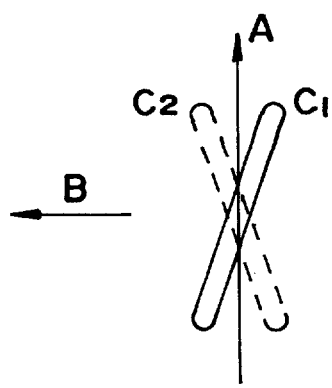
F I G. 11

LIQUID CRYSTAL APPARATUS AND DISPLAY APPARATUS

FIELD OF THE INVENTION AND RELATED ART

The present invention relates to a liquid crystal apparatus including a device comprising a liquid crystal showing ferroelectricity, such as a chiral smectic liquid crystal, disposed between a pair of substrates, particularly a liquid crystal apparatus wherein an undesirable liquid crystal molecular movement is suppressed, and a display apparatus or data transmission apparatus including the liquid crystal apparatus.

A ferroelectric liquid crystal can generally assume a non-helical chiral smectic C phase (SmC*) or H phase (SmH*) in a specific temperature range. In this state, the ferroelectric liquid crystal assumes either a first optically stable or a second optically stable state depending on an electric field applied thereto and retains the resultant state in the absence of an electric field, thus exhibiting bistability. Further, the ferroelectric liquid crystal has a quick responsiveness to a change in electric field and is therefore expected to be widely applicable for providing high-speed and memory-type display devices.

In case of continuing a long period of display operation by using a liquid crystal device (panel) as shown in FIG. 10 containing such a chiral smectic liquid crystal showing ferroelectricity (not shown) between a pair of substrates 101 and 102, there has been observed a phenomenon that an edge region 104 (hatched in FIG. 10) in a display area 103 of the liquid crystal is gradually colored into a yellowish tint. Such a phenomenon, when caused, not only provides an inferior appearance on the display panel but also causes a change in switching characteristic of the liquid crystal at a pixel. This phenomenon is particularly noticeable in a liquid crystal cell (panel) using a chiral smectic liquid crystal placed in a uniform alignment state.

It has been found that the above-mentioned phenomenon is caused by a thickness increase in the edge region 104 due to the movement of the ferroelectric liquid crystal toward the edge region 104 in the display area 103 in a direction related with an aligning treatment (average direction) represented by an arrow A (FIG. 10) applied to at least one of the substrates 101 and 102.

As a result of further study, it is now assumed that the above-mentioned movement of liquid crystal molecules showing ferroelectricity is caused by an electrodynamic effect attributable to perturbation of dipole moment of liquid crystal molecules due to an AC-like electric field caused by pulse signals for driving the liquid crystal.

Further, it is assumed that a liquid crystal molecular movement direction B is determined in relation with the aligning treatment direction A applied to at least one substrate and an average molecular axis direction $C_1$ or $C_2$ of liquid crystal molecules, etc.

As the liquid crystal molecular movement direction B depends on the aligning treatment direction A, it is assumed that the liquid crystal movement phenomenon depends on factors, such as the pretilt of liquid crystal molecules at a substrate boundary and the direction of bending of smectic layers stable in view of elastic energy governed by the pretilt.

Further, there has been also observed a tendency that the direction and amount of the liquid crystal movement are affected by the strength of alignment control force which is believed to be regulated by the aligning treatment. However, a weaker alignment control force alone is believed impossible to suppress the movement while retaining the good alignment state of the liquid crystal.

According to our study, it has been found that the direction, amount, etc., of the movement of a liquid crystal showing ferroelectricity are closely related with external factors, such as temperature, and the intensity and frequency of electric field applied to the liquid crystal device. Further, there are also internal factors affecting the liquid crystal movement, including a pretilt angle a of liquid crystal molecules at a substrate boundary, an alignment state, and physical properties of a chiral smectic liquid crystal, such as a spontaneous polarization Ps, a magnitude of cone angle(H), and smectic phase layer inclination angle δ.

Among these factors, the temperature, electric field intensity and frequency are in a relationship of trade-off with the spontaneous polarization Ps, etc., affecting the response speed, and receive a constraint from design factors, such as a frame frequency and a duty factor, of liquid crystal display apparatus. Accordingly, it is difficult to attain a remarkable improvement by changing these factors.

Accordingly, we have made extensive study by independently changing device factors, such as physical properties of liquid crystal materials and physical properties of alignment materials and combinations of these factors. As a result, it has been found effective to have the smectic layer inclination angle 6 of a chiral smectic liquid crystal 104 showing ferroelectricity as shown in FIG. 12A approach 0 deg. with respect to a substrate normal to form a structure closer to a bookshelf structure shown in FIG. 12B for preventing the liquid crystal movement phenomenon.

As a method of forming a smectic liquid crystal layer structure closer to the bookshelf structure within a liquid crystal device containing a liquid crystal in chiral smectic C phase (SmC*), it has been known to apply a high electric field of AC at a low frequency to a liquid crystal material as disclosed in Molecular Crystals and Liquid Crystals, Vol. 207, page 287. It has been confirmed by X-ray diffraction analysis that such a material provides a smectic layer inclination angle of nearly 0 deg. when supplied with an AC electric field of ca. 5 V/pm and 10 Hz.

However, such a liquid crystal material causing a reversible change into a bookshelf structure under application of a high electric field of a low frequency, causes a switching at a much lower electric field intensity than that required for causing the layer structure change, so that it is difficult to establish the bookshelf structure compatibly with an actual drive.

Further, it has been also known to cause an irreversible change into a bookshelf structure by application of a low frequency AC electric field according to an appropriate liquid crystal device designing. Such a liquid crystal device can retain the bookshelf structure during drive but the resultant layer structure is unstable against a temperature change, so that even a temperature change of ca. 5° C. can remarkably deteriorate the alignment state to result in inferior display characteristics.

SUMMARY OF THE INVENTION

In view of the above-mentioned circumstances, a principal object of the present invention is to provide a liquid crystal apparatus capable of retaining good switching characteristics while suppressing a local liquid crystal thickness change between the substrates due to liquid crystal molecular movement during a long period of drive.

Another object of the present invention is to provide a display apparatus including such a liquid crystal apparatus.

According to the present invention, there is provided a liquid crystal apparatus, comprising:

a liquid crystal panel including a pair of oppositely disposed substrates each having an electrode thereon, an alignment film disposed over the electrode on at least one of the substrates, and a liquid crystal disposed between the substrates; the liquid crystal being composed of a plurality of liquid crystal layers each composed of a plurality of liquid crystal molecules, and drive means for driving the liquid crystal suitable for applying to the liquid crystal an electric field insufficient to cause a switching of the liquid crystal but sufficient to cause a reversible change of the liquid crystal layers into a bookshelf structure.

According to another aspect of the present invention, there is provided a display apparatus, comprising:

a liquid crystal panel including a pair of oppositely disposed substrates each having an electrode thereon, an alignment film disposed over the electrode on at least one of the substrates, and a liquid crystal disposed between the substrates; the liquid crystal being composed of a plurality of liquid crystal layers each composed of a plurality of liquid crystal molecules, and drive means for driving the liquid crystal suitable for applying to the liquid crystal an electric field insufficient to cause a switching of the liquid crystal but sufficient to cause a reversible change of the liquid crystal layers into a bookshelf structure;

wherein said drive means includes:

a graphic controller for outputting graphic data and a scanning scheme signal, a scanning signal control circuit for outputting scanning address data and a scanning scheme signal, a data signal control circuit for outputting display data and a scanning scheme signal, a scanning signal application circuit for applying a scanning signal to the liquid crystal panel, and a data signal application circuit for applying data signals to the liquid crystal panel.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 6 and 8 are graphs showing the results of liquid crystal movement speed measurement in liquid crystal panels according to Examples 1 and 2, respectively, described hereinafter.

FIG. 10 is a schematic plan view of a liquid crystal panel for illustrating a liquid crystal movement phenomenon.

FIG. 11 is an illustration of a liquid crystal movement direction (B) and an aligning treatment direction (A).

DESCRIPTION OF THE PREFERRED EMBODIMENTS

The liquid crystal apparatus according to the present invention is characterized by a combination of a liquid crystal panel and drive means therefor. More specifically, the liquid crystal panel includes a pair of oppositely disposed substrates each having an electrode thereon, an alignment film disposed over the electrode on at least one of the substrates, and a liquid crystal disposed in a layer between the substrates, wherein the liquid crystal material, the alignment film for controlling the alignment characteristic of the liquid crystal, other material and treatment conditions are optimally selected, so that the liquid crystal is composed of a plurality of liquid crystal layers, preferably smectic layers, each composed of liquid crystal molecules, and the liquid crystal is reversibly placed in a bookshelf structure from its chevron structure (as-produced state, under no voltage application) by application of an electric field insufficient to cause a switching between stable states of the liquid crystal but sufficient to cause a reversible change of the liquid crystal layers into the bookshelf structure by the drive means.

In the liquid crystal apparatus, by application of appropriate drive signals providing an electric field as described above not causing a liquid crystal molecular switching to the liquid crystal, the liquid crystal layer structure change into the bookshelf structure is caused intermittently or continuously during the liquid crystal drive, thus providing the bookshelf structure resistant to the liquid crystal molecular movement. As a result, the local change in spacing between the substrates of the panel during a long period of drive is prevented to provide excellent display characteristics.

More preferably, the electrodes on the pair of substrates may be designed to form a matrix electrode structure, whereby the liquid crystal panel is subjected to a matrix drive by applying a scanning signal and data signals thereto while causing the above-mentioned liquid crystal layer structure change by application of a level of voltage comparable to that of data signals.

Figure 1:
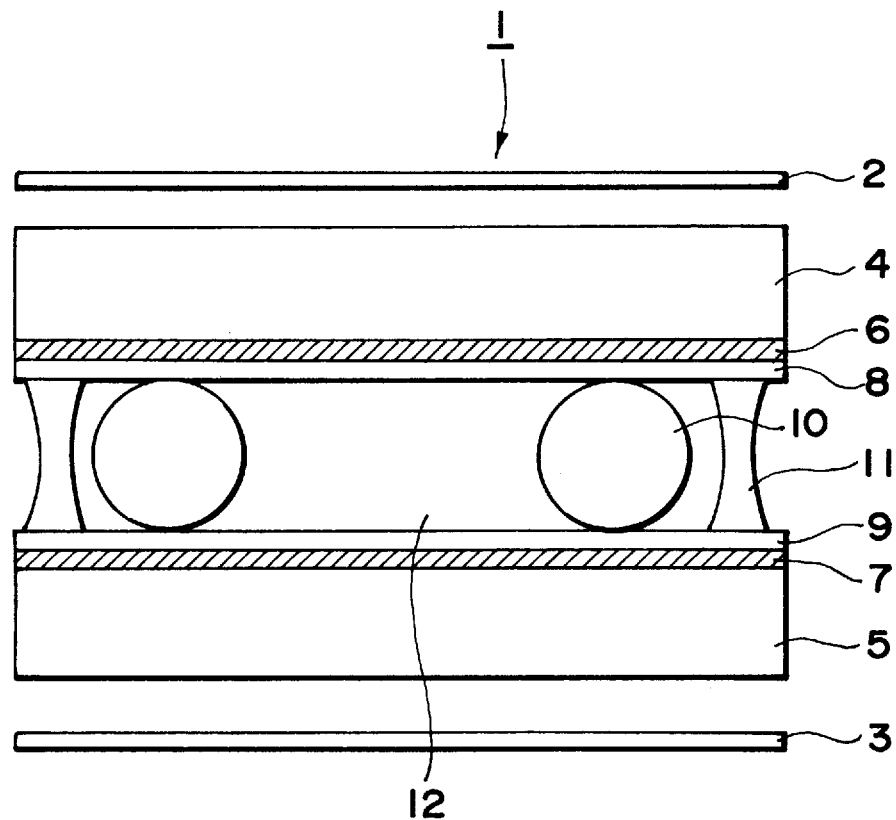
FIG. 1 is a schematic sectional view of a liquid crystal panel according to an embodiment of the invention.

FIG. 1 is a schematic sectional view of a liquid crystal panel 1 constituting an embodiment of the liquid crystal apparatus according to the present invention. The liquid crystal panel 1 includes glass substrates 4 and 5 disposed opposite to each other between a pair of polarizers 2 and 3. The glass substrates 4 and 5 are provided with electrodes 6 and 7, respectively, for applying an electric field to a liquid crystal disposed therebetween and each comprising a transparent conductor, and further with alignment films 8 and 9, respectively, for controlling the alignment state of the liquid crystal. Between the alignment films 8 and 9, spherical spacer beads 10 of a uniform diameter are dispersed, and the glass substrates 4 and 5 are bonded to each other with adhesive beads (not shown) disposed so as not to enlarge a gap between the substrates beyond the diameter of the spacer beads 10. Further, the periphery of the substrates 4 and 5 is sealed with a sealing member 12. The resultant cell gap defined between the alignment films 8 and 9 is filled with a liquid crystal material 12 showing ferroelectricity and bistability in response to an electric field thereto and assuming the above-mentioned structure of liquid crystal layers each composed of plural liquid crystal molecules, preferably a chiral smectic liquid crystal (hereinafter, sometimes simply referred to as a "liquid crystal").

Incidentally, it is possible to dispose an insulating film of, e.g., $Ta_2O_5$ or $TiSiO_x$, between the transparent electrodes 6, 7 and the alignment films 8, 9 for preventing a short circuit between the electrodes 6 and 7 on the substrates 4 and 5.

The liquid crystal panel 11 may be subjected to a matrix drive, e.g., by using the transparent electrodes 6 as scanning electrodes for supplying a scanning signal and the transparent electrodes 7 as data electrodes for supplying data signals, respectively, from drive means (not shown).

The alignment films 8 and 9 may comprise an organic material, such as silicon monoxide, silicone dioxide, aluminum oxide, zirconia, magnesium fluoride, cerium oxide, cerium fluoride, silicon nitride, silicon carbide or boron nitride; or an organic material, such as polyvinyl alcohol, polyimide, polyamideimide, polyester, polyamide, polyesterimide, polyparaxylylene, polycarbonate, polyvinyl acetal, polyvinyl chloride, polystyrene, polysiloxane, cellulosic resin, metamine resin, urea resin or acrylic resin. At least one of the alignment films 8 and 9 may preferably be subjected to a uniaxial aligning treatment. Such an alignment film subjected to a uniaxial aligning treatment may for example be obtained by forming a film of an organic material as described above, e.g., by application of a solution thereof, evaporation or sputtering and then rubbing the surface of the film with a fibrous material, such as velvet, cloth or paper. Alternatively, it is also possible to obtain such an alignment film subjected to a uniaxial aligning treatment by oblique evaporation wherein an oxide, such as SiO or a nitride is disposed onto a substrate from a direction forming a prescribed angle with respect to the substrate.

In the present invention, it is preferred that the alignment films 8 and 9 on the substrates 4 and 5 are provided with different alignment characteristics (or aligning treatment) while it depends on the kind of the liquid crystal material (constituting the liquid crystal 12). For example, the liquid crystal material may be a chiral smectic liquid crystal which assumes a smectic phase (chiral smectic phase) without through cholesteric phase in the course of cooling from isotropic phase. In such a case, in the liquid crystal panel, batonnets are gradually generated and grown within the liquid crystal in the course of phase transition from the isotropic phase to the smectic phase to form an alignment state in the smectic phase. In this instance, it is preferred to form alignment films having different alignment characteristics on two substrates, more preferably an alignment film having a uniaxial alignment characteristic on one substrate and an alignment film having no uniaxial alignment characteristic on the other substrate, so that the batonnets are generated from one substrate and grown toward the other substrate to finally realize a homogeneous alignment of good smectic liquid crystal phase. Thus, it is possible to obtain a liquid crystal panel containing a chiral smectic liquid crystal placed in a homogeneous alignment and assuming a good bistable state. As an example of specific designing, it may be preferred in some cases to form a polyimide film subjected to a uniaxial aligning treatment on one substrate and a film of silicon-containing compound having no uniaxial alignment characteristic.

In the present invention, the liquid crystal material (12) constituting liquid crystal layers each composed of plural liquid crystal molecules, may comprise a liquid crystal showing at least two stable states, preferably in a chiral smectic phase as described above. By appropriate selection of such a liquid crystal material showing chiral smectic phase, and materials, forming conditions and aligning treatment conditions for alignment films, the above-mentioned (smectic) liquid crystal layer structure changing characteristic of causing a reversible change into a bookshelf structure by application of an electric field insufficient to cause a switching of liquid crystal molecules. It is particularly preferred that the liquid crystal assumes a first state of chevron structure under no voltage application (or in the as-produced state) and causes a reversible change into a bookshelf structure under application of an AC voltage level comparable to that of data signals (a high frequency and a low voltage, e.g., an AC voltage signal including pulses of opposite polarities having a prescribed pulse width ($\Delta t$) for causing a liquid crystal molecular switching comparable to that of a data signal and an amplitude which is about a half of a switching threshold voltage at the prescribed pulse width. The application of such an AC signal may be sometimes simply referred to as "data signal application".

Herein, the term "chevron structure" refers to a layer structure wherein respective smectic liquid crystal layers are bent at an intermediate point (generally at a mid point) thereof between a pair of substrates to provide a layer inclination angle $\delta$ (as measured by a method of Ohuchi et al described hereinafter based on X-ray diffraction) exceeding ca. 3 deg. On the other hand, the term "bookshelf structure" refers to a layer structure wherein respective smectic liquid crystal layers extend substantially without bending in a direction substantially perpendicular (i.e., a layer inclination angle $\delta$ of 0–3 deg., in a sense of including a quasi-bookshelf structure giving such a small $\delta$). The reversible changes into a bookshelf structure may be confirmed by the appearance of an X-ray diffraction peak corresponding to a bookshelf, i.e., an X-ray diffraction peak at an layer inclination angle $\delta$ of 0–3 deg. during data signal application and the disappearance of such an X-ray diffraction peak corresponding to the bookshelf structure. The change into a bookshelf structure need not be caused completely but is required to be caused at least partially. Thus, the chevron structure before the data signal application is allowed to partially remain during the data signal application as confirmed by the remaining of corresponding diffraction peaks (see FIG. 7 for Example 1 appearing hereinafter).

Specific examples of liquid crystal materials may include liquid crystal compositions containing at least one species of fluorine-containing mesomorphic compound which has a structure including a fluorocarbon terminal portion and a hydrocarbon terminal portion connected by a central core and has a smectic phase or a latent smectic phase. The term "latent smectic phase" refers to a property of a compound concerned that the compound alone does not exhibit smectic phase but can be a component compatibly contained in smectic phase of a liquid crystal composition.

The central core may include at least two rings selected from aromatic rings, aliphatic rings, substituted aromatic rings and substituted or unsubstituted heterocyclic aromatic rings. These rings can be mutually connected with a functional group selected from —COO—, —COS—, —HC=N—and —COSe—. These rings can be condensed or not condensed. The heterocyclic aromatic ring includes at least one non-carbon atom selected from N, O and S. One or more (non-neighboring) methylene groups in the aliphatic cyclic ring can be replaced with —O—.

Examples of particularly preferred fluorine-containing mesomorphic compound may include those represented by the following general formula (I) and (II).

Formula (I):

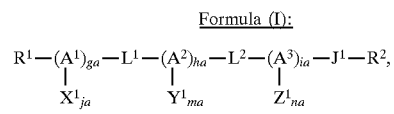

wherein $A^1$, $A^2$ and $A^3$ are each independently

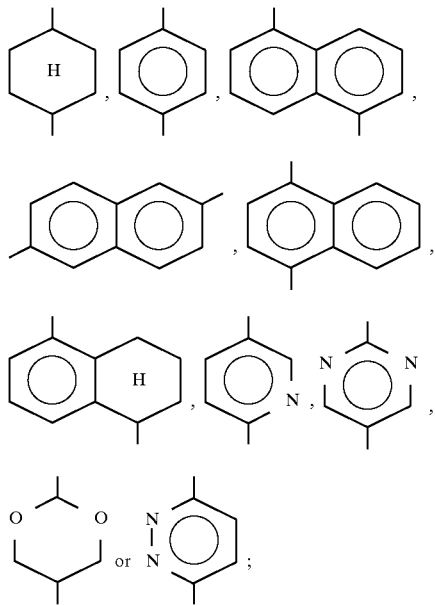

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH=N—, —N=CH—, —CH$_2$—O—, —O—CH$_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —OCH$_3$, —CH$_3$, —CN or —NO$_2$;

each ja, ma and na are independently an integer of 0–4; $J^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20, and pa is 0–4;

$R^1$ is —O—C$_{qa}$H$_{2qa}$—O—C$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{2qa}$—R$^3$, —CO—O—C$_{qa}$H$_{2qa}$—R$^3$, or —O—CO—C$_{qa}$H$_{2qa}$—R$^3$ which may be either straight chain or branched; where $R^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and qb are independently 1–20;

$R^2$ is $C_{xa}F_{2xa}$—X, where X is —H or —F, xa is an integer of 1–20.

Formula (II):

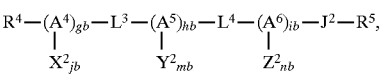

wherein $A^4$, $A^5$ and $A^6$ are each independently

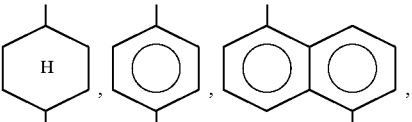

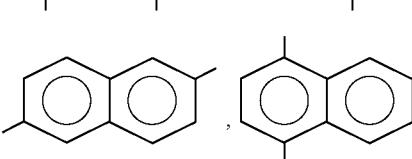

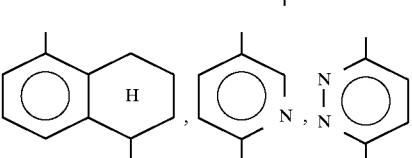

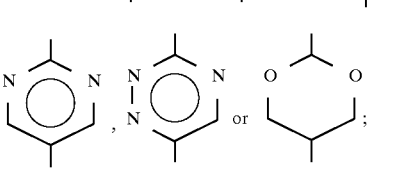

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$—(ka is 1–4), —CH=CH—, —C—C—, —CH=N—, —N=CH—, —CH$_2$—O—, —O—CH$_2$—, —COor —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; pb is 0–4;

$R^4$ is —O—(C$_{qc}$H$_{2qc}$—O)$_{wa}$—C$_{qd}$H$_{2qd+1}$, —(C$_{qc}$H$_{2qc}$—O)$_{wa}$C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; R$^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

Specific examples of the compounds represented by the general formula (I) may include those disclosed in U.S. Pat. No. 5,082,587 (corr. to JP-A 2-142753). Specific examples of the compounds represented by the general formula (II)

may include those disclosed in PCT Publication WO93/22396 (corr. to JP (Tokuhyo) 7-506369).

It is further preferred that the liquid crystal composition used in the present invention is a liquid crystal composition assuming chiral smectic phase and comprising at least three fluorine-containing mesomorphic compounds each having a fluorocarbon terminal portion and a hydrocarbon terminal portion connected with a central core and having a smectic or latent smectic phase; said at least three fluorine-containing mesomorphic compounds including at least one compound having a fluorocarbon terminal portion containing one catenary ether oxygen atom, at least one compound having a fluorocarbon terminal portion containing two catenary ether oxygen atoms, and at least one compound having a fluorocarbon terminal portion containing three catenary ether oxygen atoms.

Figure 13:
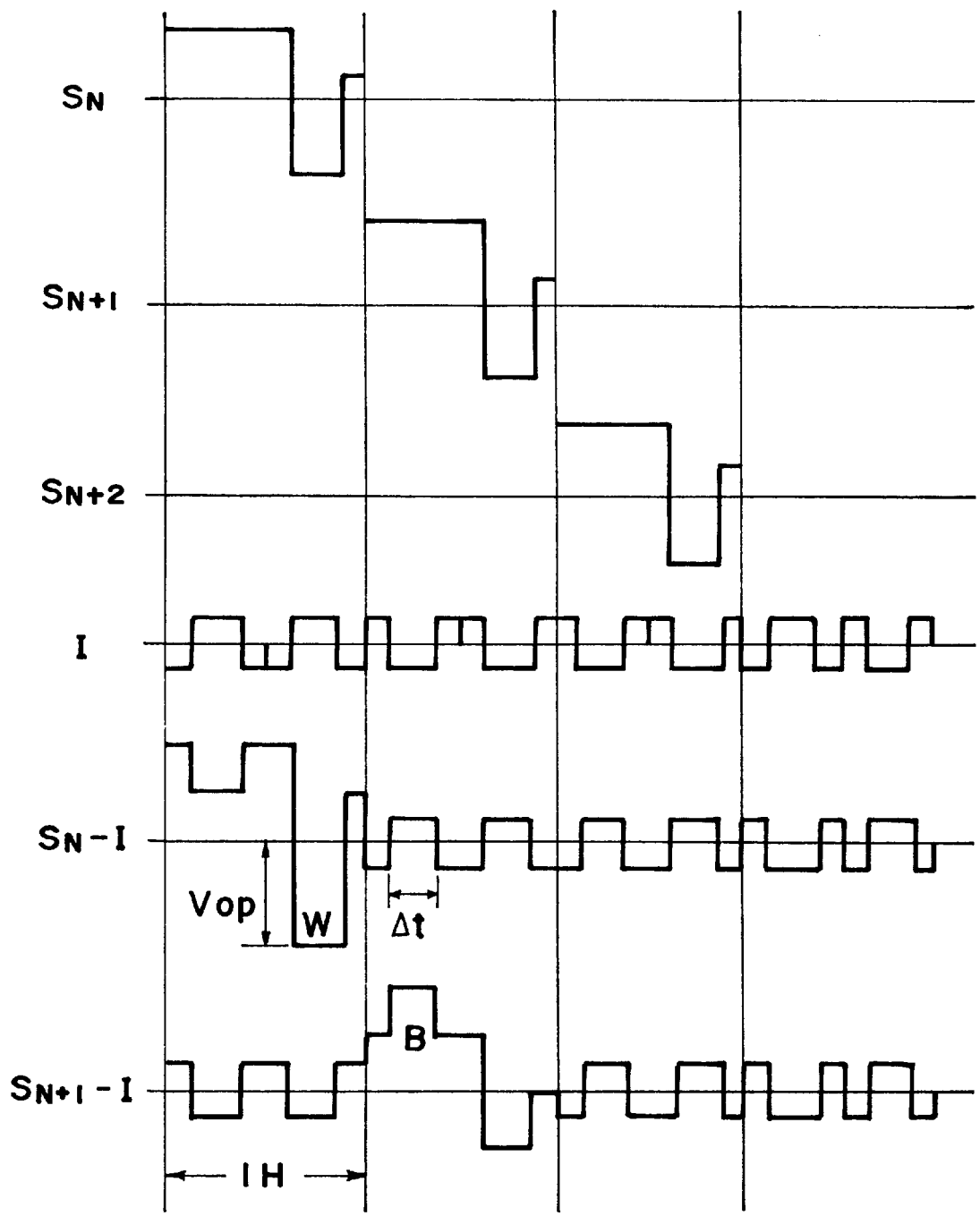
FIG. 13 is a waveform diagram showing an example set of drive signals for matrix drive of a liquid crystal apparatus according to the invention.

FIG. 13 shows an example set of drive signals which may be suitably used for a matrix drive of a liquid crystal panel is described above according to the present invention. Referring to FIG. 13, at $S_N$, $S_{N+1}$, $S_{N+2}$... are shown scanning signals sequentially applied to scanning electrodes ($S_N$, $S_{N+1}$, $S^{N+2}$...), respectively, and at I are shown data signals successively applied to a data electrode (I). In synchronism with the scanning signals $S_N$, $S_{N+1}$, $S_{N+2}$... sequentially applied to selected scanning electrodes ($S_N$ $S_{N+SN+2}$...), data signals (I) are sequentially applied to the data electrode (I) to apply combined (or synthetic) drive waveforms $S_N$—I, $S_{N+1}$—I, ... to pixels at respective intersections of these electrodes. In the drive embodiment shown in FIG. 13, within a prescribed period (1H=4Δt), a drive waveform $S_N$—I is applied to a prescribed pixel at $S_N$—I to cause a switching of the liquid crystal at the pixels into a white state (W) and, in a subsequent period (1 H), a neighboring pixel $S_{N+1}$—I is written into a black state (B, cleared state). In a non-selection period, each pixel (on a non-selected scanning line) is supplied with data signals at a level of not causing a switching of the liquid crystal. In the liquid crystal apparatus of the present invention, the reversible layer structure change into a bookshelf is caused at the respective pixels by application of the data signals. In other words, the bookshelf layer structure is ensured by continual application of such data signals (preferably not including a pause period (i.e., period of voltage 0) longer than Δt, further preferably Δt/2), but having an amplitude in the range of ca. 15% to 80% of a threshold voltage causing the liquid crystal switching at the prescribed pulse width (Δt)).

A liquid crystal layer structure of a liquid crystal 12 in a liquid crystal panel 1 described above may be examined by X-ray diffraction analysis. The X-ray diffraction analysis may be performed in a manner similar to a method disclosed by Clark and Lagerwall (Japan Display, 86, Sep. 30–Oct. 2, (1986), pp. 456–458) or a method of Ohuchi, et al (Japanese Journal of Applied Physics, 27 (5), (1988), pp. L725–728). More specifically, a detector is fixed at a position determined by an angle $2\theta_B$, wherein $\theta_B$ is a Bragg angle determined by the Bragg's first-order diffraction formula (1) below based on a preliminary X-ray diffraction analysis of the liquid crystal in its bulk state:

$$\lambda = 2d \cdot \sin\theta_B \quad (1),$$

wherein d denotes a layer spacing of the liquid crystal 12, and λ is a wavelength of X-ray (e.g., 1.54050 Å of CuKα-ray), and a sample liquid crystal device 1 is rotated while X-ray is incident thereto, to effect an ordinary rocking curve measurement. The glass substrates 4 and 5 in the sample liquid crystal device may preferably be sufficiently thin so as to suppress the X-ray absorption during a transmission-mode measurement.

Figure 2:
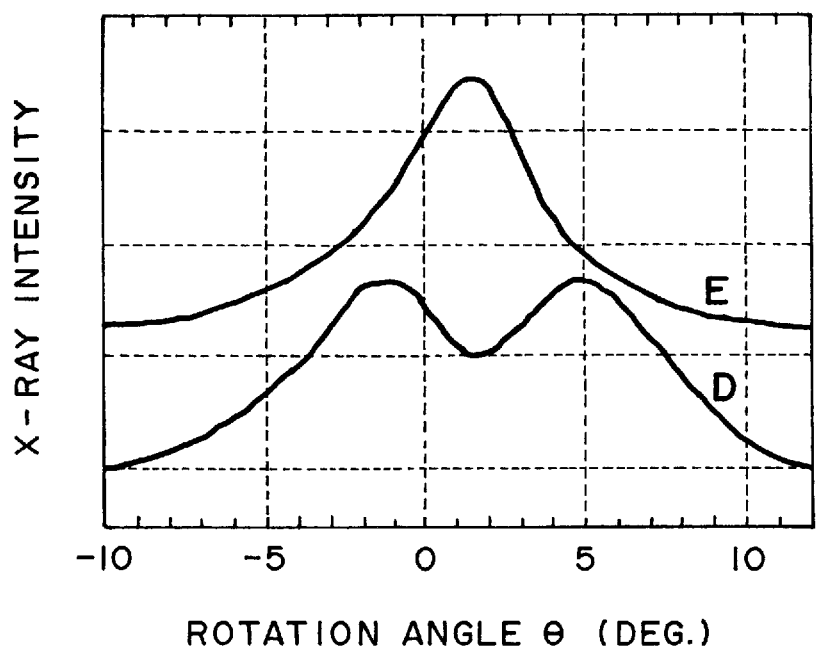
FIG. 2 is a graph showing X-ray diffraction patterns D and E of a liquid crystal in a liquid crystal panel according to an embodiment of the invention before and during application of data signals, respectively.

FIG. 2 is a graph showing idealized X-ray diffraction patterns representing liquid crystal layer structures of a chiral smectic liquid crystal 12 in a liquid crystal panel according to the present invention before (D) and during (E) application of data signals (at a level not causing a switching of the chiral smectic liquid crystal) according to a matrix drive scheme described with reference to FIG. 13.

Figure 12A:
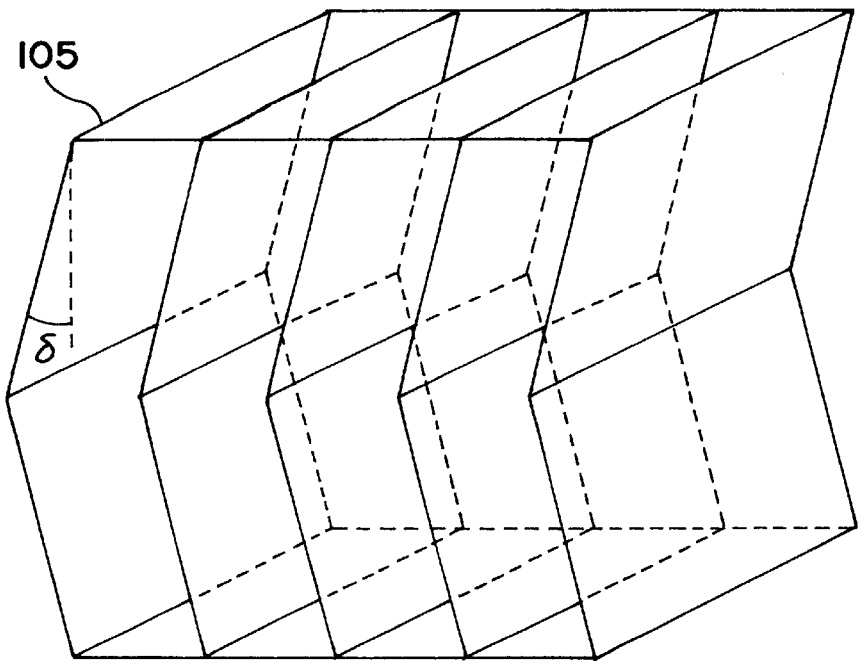
FIGS. 12A and 12B are schematic illustrations of a chevron structure and a bookshelf structure, respectively, of liquid crystal layers.

In case where the chiral smectic liquid crystal 12 in the liquid crystal panel 1 assumes a chevron structure (as illustrated by FIG. 12A), there is observed an X-ray diffraction pattern (D in FIG. 2) including two diffraction peaks corresponding to two layer planes of the chevron structure at rotation angles $\theta_B \pm \delta$ determined by a Bragg angle θB and a smectic layer inclination angle δ in the chevron structure.

Figure 12B:
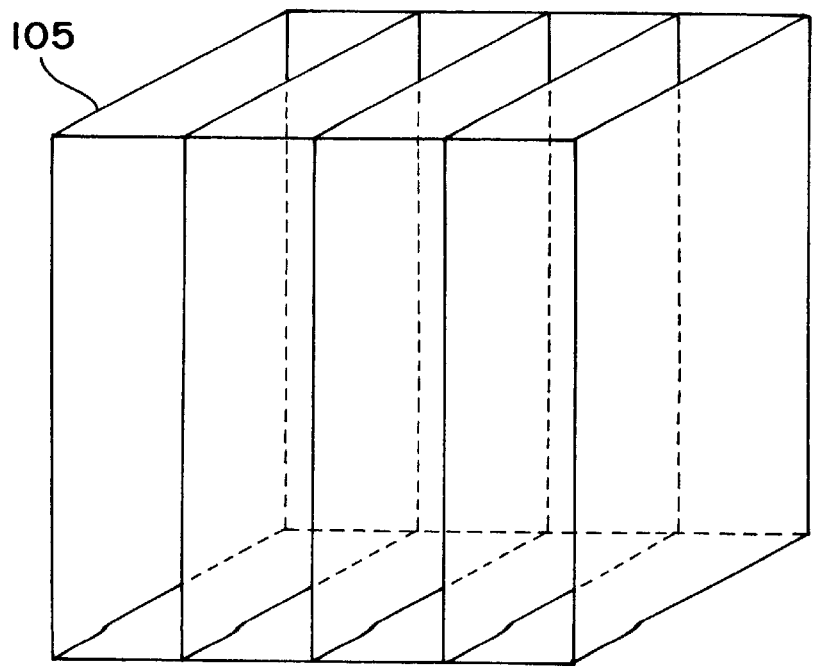

On the other hand, in cause where the chiral smectic liquid crystal 12 in the liquid crystal panel substantially assumes a bookshelf structure (as illustrated by FIG. 12B), there is observed an X-ray diffraction pattern (E in FIG. 2 as obtained under application of data signals) including a single diffraction peak at a Bragg angle $\theta_B$.

Accordingly, as is understood from X-ray diffraction patterns shown in FIG. 2, it is assumed that, as a result of appropriate selection of a liquid crystal material in combination with an alignment film and a treatment condition therefor, a chevron structure can be transformed into a bookshelf structure under application of a weak electric field as given by data signals not causing liquid crystal molecular switching.

Moreover, when application of data signals to the liquid crystal panel having given the X-ray diffraction pattern (E in FIG. 2) is terminated, it has been confirmed that the liquid crystal panel provides an X-ray diffraction pattern substantially identical to the one (D in FIG. 2) obtained before the data signal application. Thus, it has been confirmed that the liquid crystal layer structure change is a reversible one obtainable during the electric field application.

Figure 3:
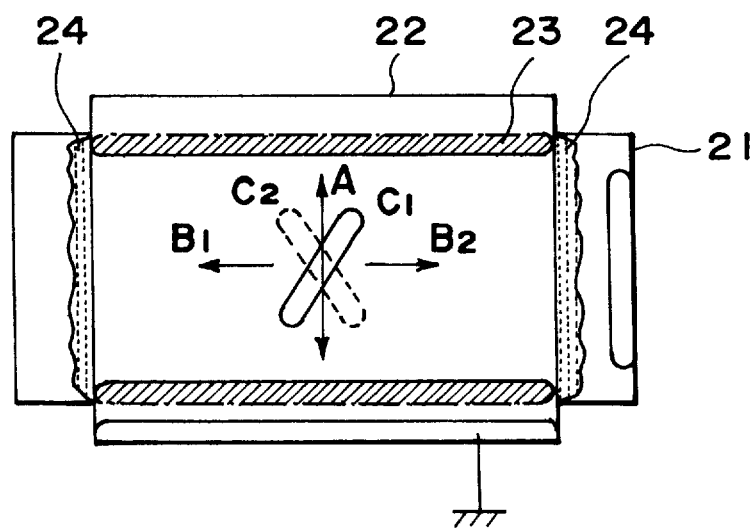
FIG. 3 is a schematic plan view for illustrating a method of measuring liquid crystal movement speed in a liquid crystal panel.

On the other hand, the movement speed of the liquid crystal 12 (in chiral smectic phase) may be measured by using a liquid crystal device as shown in FIG. 3 obtained by applying a pair of glass substrates 21 and 22, at least one of which has been subjected to an aligning treatment (rubbing) in a direction A, to each other with stripes 23 of a sealing member printed in a direction perpendicular to the rubbing direction A, and injecting a liquid crystal (not shown) into a gap between the substrates, so that the liquid crystal device has an identical sectional structure as the liquid crystal panel 1 in FIG. 1 except for leaving open edges (parts close to parts denoted by reference numeral 24).

Figure 4A:
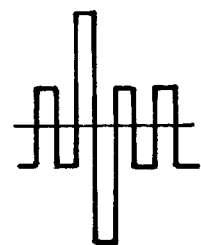
FIGS. 4A and 4B illustrate two types of liquid crystal drive signals.
Figure 4B:
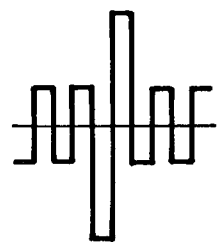

Then, at both open edges of the liquid crystal device, silicone oil 24 is dripped as a marker for observing the liquid crystal movement in direction $B_1$ and $B_2$, a waveform shown in FIG. 4A or 4B for uniformly providing a molecular axis direction $C_1$ or $C_2$ and for causing the liquid crystal molecular movement. In the drive waveforms (which are combined voltage signals applied to the liquid crystal) shown in FIGS. 4A and 4B, a pair of higher amplitude pulses are switching pulses including the latter one determining the resultant state $C_1$ or $C_2$, and lower amplitude pulses following them correspond to data signals in a matrix drive having an amplitude insufficient to cause liquid crystal molecular switching. During the liquid crystal device drive, if the liquid crystal (not shown) is moved in the direction B1 or B2, the silicone oil 24 at the right edge or the left edge is pulled through the open edge into the gap between the substrates 21 and 22, whereby the liquid crystal movement can be confirmed. Incidentally, the liquid crystal movement characteristic (or direction) is taken as positive (+) if it moves in the direction B1 when it assumes a molecular axis direction C1 in indicating results shown in FIGS. 5, 6 and 8 described hereinafter.

Figure 5:
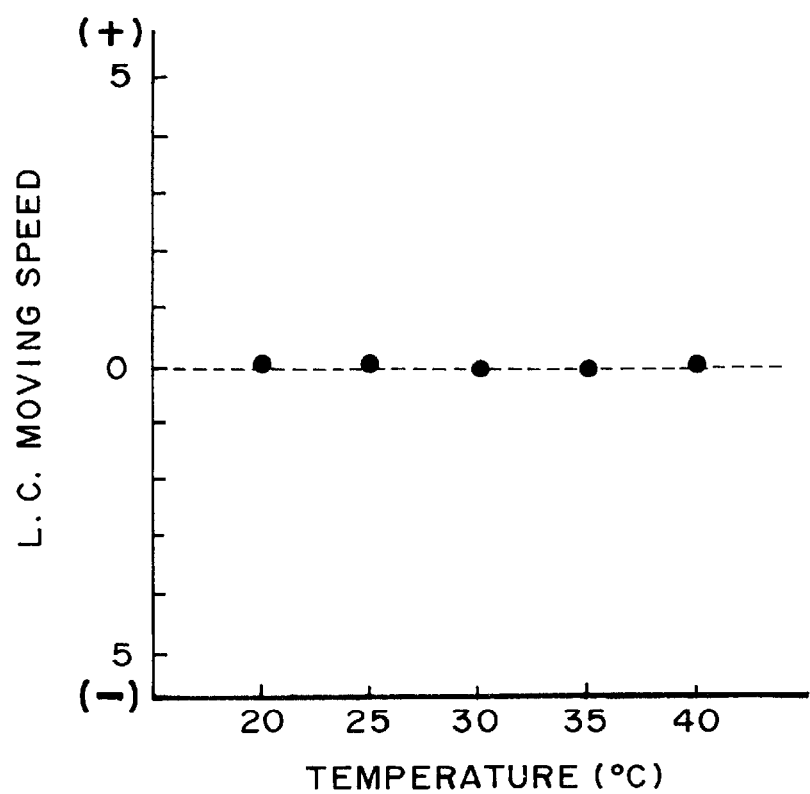
FIG. 5 is a graph showing a tendency of liquid crystal movement speed measurement along a liquid crystal panel according to an embodiment of the invention.

FIG. 5 is a graph showing a liquid crystal movement characteristic when the liquid crystal device shown in FIG. 3 is driven by application of data signals at varying temperatures. As is understood from the results shown in FIG. 5, the liquid crystal movement speed in the liquid crystal panel constituted according to the present invention is substantially 0 over a temperature range of 20°–40° C., thus indicating substantially no liquid crystal movement.

Then, the application of data signals is discontinued, and the alignment state in the liquid crystal device is examined at various-temperatures, whereby substantially no change in liquid crystal molecular alignment state has been observed by a temperature change within the chiral smectic phase (SmC*) range.

Further, when the liquid crystal device under no application of electric field (data signal) is subjected to the X-ray diffraction analysis at various temperatures, it has been observed that the resultant chevron structure indicates two diffraction peaks of which the peaks appear at different positions at different temperatures, thus indicating that the alignment deterioration due to a temperature-dependent liquid crystal layer thickness change may be suppressed by a change in chevron angle.

Figure 9:
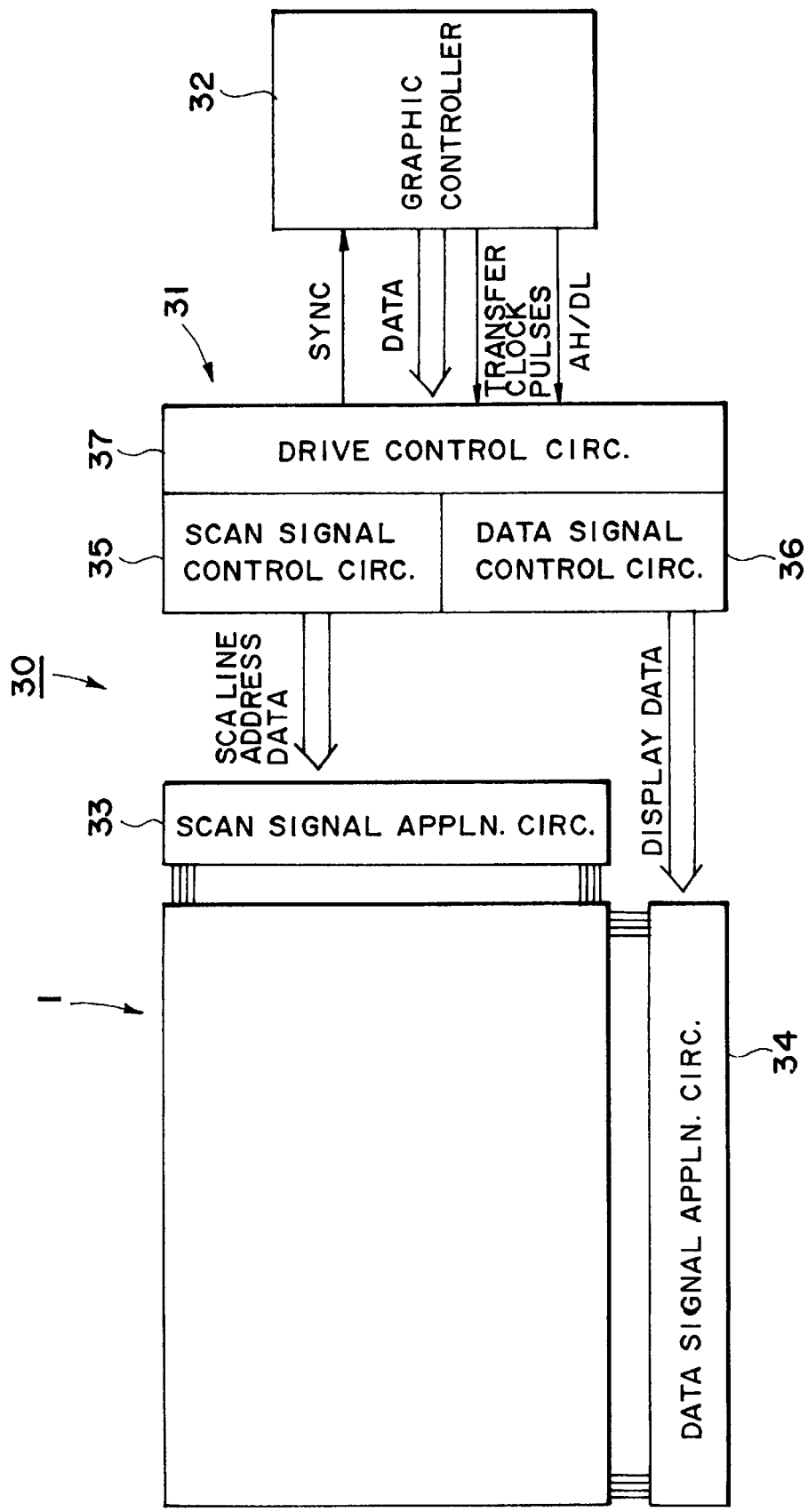
FIG. 9 is a block diagram of an embodiment of display apparatus including a liquid crystal apparatus according to the present invention.

FIG. 9 is a block diagram of a liquid crystal display apparatus 30 including a liquid crystal panel 1 as described above as a display panel. The display apparatus 30 includes a liquid crystal panel 1 as described above, a drive control unit 31 and a graphic controller 32.

The liquid crystal panel 1 has, e.g., 1280×1024 pixels, each formed at each intersection of scanning electrodes and data electrodes as described above. The liquid crystal panel 1 is connected with a scanning signal application circuit 33 and a data signal application circuit 34, which in turn are connected to the drive control unit 31.

The drive control unit 31 includes a scanning signal control circuit 35, a data signal control circuit 36 and a drive control circuit 37. The scanning signal control circuit 35 supplies scanning line address data to the scanning signal application circuit 33, and the data signal control circuit 36 supplies display data to the data signal application circuit 34. The scanning signal control circuit 35 and the data signal control circuit are supplied with graphic data, a scanning scheme signal, etc. via the drive control circuit from the graphic controller 32.

The graphic data outputted from the graphic controller 32 is converted into address data and display data by the scanning signal control circuit 35 and the data signal control circuit 36, respectively, and the scanning scheme signal is supplied as it is to the scanning signal application circuit 33 and the data signal application circuit 34.

The scanning signal application circuit 33 applies a scanning signal having a waveform determined by the scanning scheme signal to the scanning electrodes (not shown) of the display panel 1 selected in a sequence determined according to the address data, and the data signal application circuit 34 applies data signals having waveforms determined by a display state of white or black conveyed by the display data and the scanning scheme signal to the data electrodes (not shown) of the display panel 1.

The liquid crystal display apparatus 30 according to this embodiment includes the liquid crystal panel wherein the liquid crystal molecular movement is suppressed and thus allows a good quality of display.

Hereinbelow, the present invention will be described based on specific examples.

EXAMPLE 1

Two liquid crystal devices (panels)/each having a structure as shown in FIG. 1 were prepared. Thus, each panel 1 included a pair of glass substrates 4 and 5 having thereon ca. 900 Å-thick transparent electrodes (ITO films) 6 and 7, respectively, formed by sputtering, and alignment films 8 and 9. Between the substrates 4 and 5, a liquid crystal was injected and disposed together with spacer beads 10 and sealed up with a sealing member 11, to form a cell (panel) structure, which was sandwiched between polarizers 2 and 3.

Two pairs of glass substrates 4 and 5 were provided, including one pair each having a thickness of 1.1 mm for providing a device for measuring a liquid crystal molecular movement speed as shown in FIG. 3, and another pair each having a thickness of 80 μm ("MICROSHEET", available from Corning Glass Works) for providing a device for the X-ray diffraction analysis for determining liquid crystal layer structure.

On the transparent substrate 6 of one glass substrate 4 of each pair, a polyamic acid in NMP solution was applied by spin coating, followed by baking at 200° C. for ca. 1 hour to form a ca. 50 Å-thick alignment film 8 of polyimide represented by the following recurring unit:

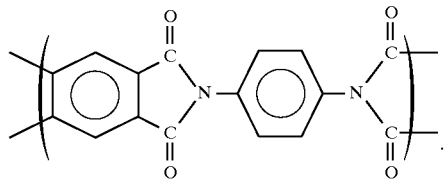

The thus formed alignment film 8 was subjected to rubbing under the following conditions to form a first substrate:

Rubbing cloth material: nylon
Roller diameter: 85 mm
Pressing depth: 0.3 mm
Roller revolution speed: 1000 rpm
Step feed rate: 5 mm/sec
Number of repetition: three times On the other hand, on the transparent electrode 7 on the other glass substrate 5 of each pair, a silane coupling agent (octadecyltriethoxy-silane) was applied by spin coating and dried to form an at most ca. 20 Å-thick non-uniaxial alignment film 9 of silane coupling agent, thus providing a second substrate.

By using two pairs having different thicknesses of the first and second substrates, two liquid crystal devices each having a cell gap of 2 mm for the liquid crystal movement speed measurement and the X-ray diffraction analysis were prepared.

More specifically, the liquid crystal device for the liquid crystal movement speed measurement (as shown in FIG. 3) was prepared by applying the above-prepared first and second substrates including the 1.1 mm-thick glass substrate 4 and 5 to each other with stripe-form printed sealing members (11) in a direction perpendicular to the aligning treatment direction (A), and a liquid crystal was injected in its isotropic phase between the substrates.

The liquid crystal used was a mixture comprising the following compounds A–E in weight ratios of A/B/C/D/E= 46.4/15.5/30.9/5.2/2.0.

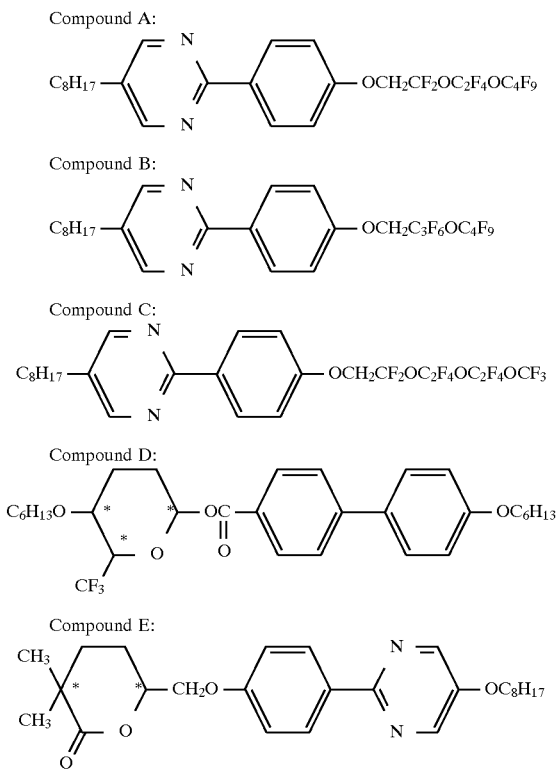

The mixture liquid crystal showed the following phase transition temperatures and physical parameters:

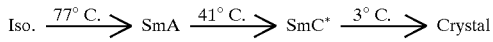

Title angle (H) (at 30° C.)=24.4 deg.
Spontaneous polarization Ps (at 30° C.)=−31.1 (nC/cm$^2$)

Incidentally, the above-mentioned liquid crystal mixture has been found to exhibit a particularly good alignment state in a liquid crystal device structure including one substrate provided with a rubbed alignment film and the other substrate provided with a non-rubbed alignment film according to our study.

The liquid crystal devices were prepared by injecting the liquid crystal mixture in its isotropic phase into the cell structure described above and cooled to 30° C., where the alignment state of the liquid crystal was observed. As a result, both liquid crystal devices exhibited a good uniform alignment state with little alignment defects and exhibited a large apparent tilt angle θa (a tilt angle in memory states after electric field application) of 22 deg. on an average.

The liquid crystal mixture was also confirmed to be a chiral smectic layer structure showing at least two optically stable states in the alignment state and exhibited a tilt angle (H) and an apparent tilt angle satisfying (H)>θa>(H)/2.

The above-mentioned parameters are based on values measured according to the following methods.

[Tilt angle (H)]

An AC electric field of ±30–50 volts and 1–100 Hz is applied between the substrates of a sample liquid crystal device disposed between a pair of right angle cross nicols polarizers, and the liquid crystal device is rotated relative to and in parallel with the polarizers while observing an optical response of the liquid crystal device through a photomultiplier (available from Hamamatsu Photonics K.K.), thereby detecting a first extinction position (position giving a lowest transmittance) and a second extinction position under the voltage application. A half of the angle between the first and second extinction position is taken as a tilt angle (H).

[Apparent tilt angle θa]

A single pulse of one polarity exceeding a threshold is applied to a liquid crystal device placed between right angle cross nicol polarizers, and then the liquid crystal device is rotated relative to the polarizers under no voltage application to find a first extinction position. Then, a single pulse of the opposite polarity exceeding the threshold is applied, and then the liquid crystal device is rotated relative to the polarizers under no voltage application to find a second extinction position. A half of the angle between the first and second extinction positions is taken as an apparent tilt angle θa.

[Spontaneous polarization Ps]

The spontaneous polarization of a liquid crystal is measured according to "Direct Method with Triangular Waves for Measuring Spontaneous Polarization in Ferroelectric Liquid Crystal", as described by K. Miyasato, et al. (Japanese J. Appl. Phys. 22, No. 10, L661 (1983)).

For measurement of the liquid crystal movement speed as illustrated in FIG. 3, the electrodes of the liquid crystal device prepared above were connected to drive voltage supply means (not shown) and silicone oil was dripped at open edges 24 of the device as a marker. Then, the device was driven by applying a driving waveform (e.g., as shown in FIG. 4A or 4B) for providing a liquid crystal molecular axis direction $C_1$ or $C_2$ with respect to the aligning treatment direction $\underline{A}$ under the conditions of a writing voltage of 20 volts, a writing pulse width (Δt) of 30 μsec (=1.2 times the threshold), a bias ratio of ⅓, and a duty factor of ¹⁄₁₀₀₀. The measurement was performed at various temperatures including 20° C., 25° C., 30° C. and 35° C. The movement speed was calculated from the distance of intrusion of the silicone oil into the device within 5 hours.

FIG. 6 shows the results of the above-described liquid crystal movement speed measurement. As is understood from the results shown in FIG. 6 (wherein one scale represents "mm/hr"), the liquid crystal movement speed was substantially 0 within the temperature range of 20°–35° C., and this was also true outside the range. Thus, the liquid crystal caused substantially no movement.

Figure 7:
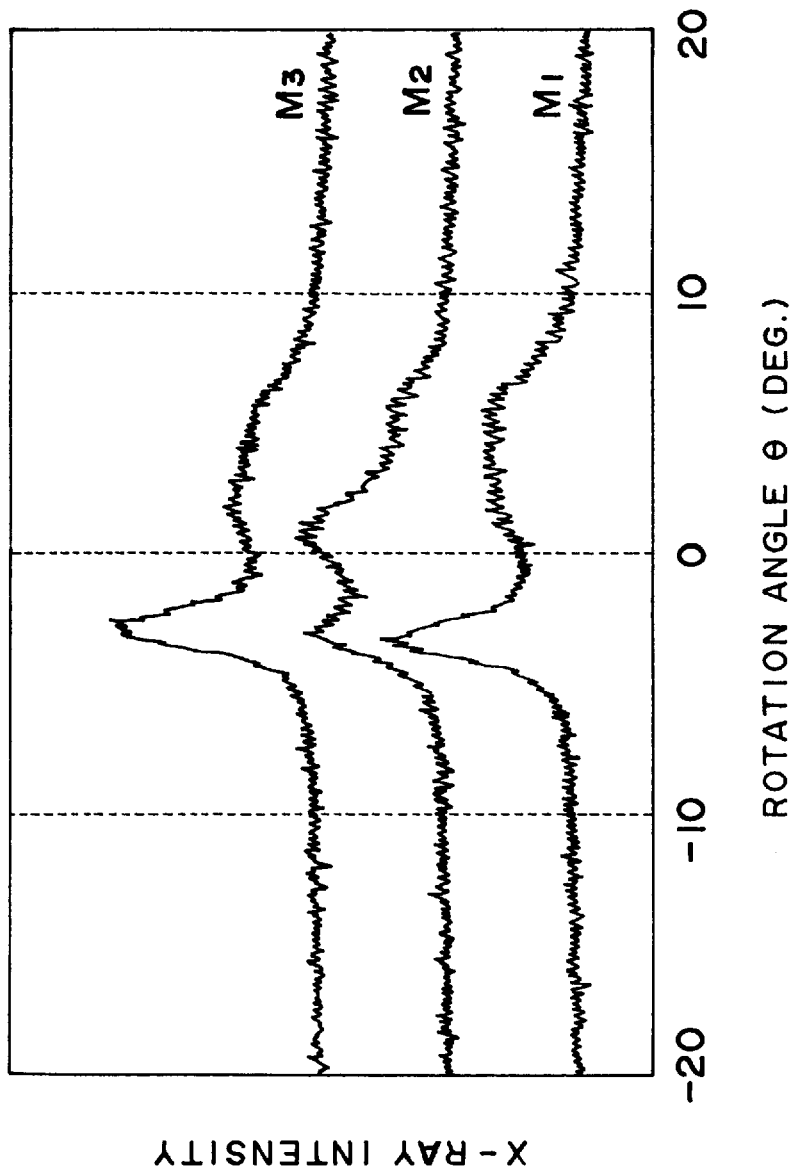
FIG. 7 is a graph showing X-ray diffraction patterns in the liquid crystal panel according to Example 1 before, during and after application of data signals, respectively.

On the other hand, the liquid crystal device for the X-ray diffraction analysis was prepared by using the above-prepared first and second substrates including the 80 μm-thick glass substrates 4 and 5 and then supplied with the waveform shown in FIG. 4A under the conditions identical to those described above with reference to the liquid crystal movement speed measurement to examine the layer structure of the liquid crystal before and during the application of the data signals and also after termination of the data signal application by the X-ray diffraction analysis according to the transmission method described above at 30° C. FIG. 7 shows the results. In FIG. 7, $M_1$, $M_2$ and $M_3$ represent X-ray diffraction patterns for the liquid crystal before, during and after termination of, respectively, the data signal application. Referring to FIG. 7, the pattern $M_1$ (before the data signal application) indicates a partially deformed chevron structure as represented a sharp peak at a rotation angle of ca. −3 deg. and a dull peak or shoulder at a rotation angle of ca +6–7 deg., the pattern $M_2$ (during the data signal application) indicates a partial occurrence of a bookshelf structure as represented by a peak at ca. 1 deg. (Bragg angle), and the pattern $M_3$ (after terminating the data signal application) is substantially identical to the pattern $M_1$ (before the data signal application) indicating a partially deformed chevron structure with substantial disappearance of the peak at ca. 1 deg. representing the bookshelf structure, so that it was confirmed that the layer structure change as observed in the pattern is a reversible one.

The X-ray diffraction analysis was repeated at different temperatures, whereby a similar layer structure change as shown in FIG. 7 was confirmed.

After the drive of the liquid crystal device was terminated, the device was observed through a polarization microscope at different temperatures within the SmC* phase range, whereby no change in alignment state was observed and a stable alignment state was confirmed.

Comparative Example

For comparison with Example 1, comparative liquid crystal devices (panels) for liquid crystal movement speed measurement and X-ray diffraction analysis were prepared in the same manners as in Example 1 except for using a liquid crystal mixture comprising the following compounds in weight ratios of F/G/H/I/J=50.0/15.0/10.0/15.0/5.0.

Compound F:

$C_8H_{17}$—[pyrimidine ring]—[benzene ring]—$OCH_2$—$CF_2$—$OCF_2CF_2$—$OC_4F_9$ Compound G:

$C_8H_{17}$—[pyrimidine ring]—[benzene ring]—$OCH_2$—$C_7F_{15}$

Compound H:

$C_9H_{19}$—[pyrimidine ring]—[benzene ring]—$OCH_2$—$C_7F_{15}$

Compound I:

$C_{10}H_{21}$—[pyrimidine ring]—[benzene ring]—$OCH_2C_7F_{15}$

Compound J:

$C_{10}H_{21}$—[pyrimidine ring]—[benzene ring]—$(CH_2)_2$—[chiral lactone]—$C_6H_{13}$ The mixture liquid crystal showed the following phase transition temperatures and physical parameters:

Iso. $\xrightarrow{80.3°\ C.}$ SmA $\xrightarrow{48.2°\ C.}$ SmC* $\xrightarrow{-4.8°\ C.}$ Crystal Title angle Ⓗ (at 30° C.)=28.9 deg.

Spontaneous polarization Ps (at 30° C.)=−28 (nC/cm²)

Incidentally, the above-mentioned liquid crystal mixture also has been found to exhibit a particularly good alignment state in a liquid crystal device structure including one substrate provided with a rubbed alignment film and the other substrate provided with a non-rubbed alignment film according to our study.

The comparative liquid crystal devices were prepared by injecting the liquid crystal mixture in its isotropic phase into the cell structure described above and cooled to 25° C., where the alignment state of the liquid crystal was observed.

As a result, both liquid crystal devices exhibited a good uniform alignment state with little alignment defects and exhibited an apparent tilt angle of 22.5 deg. on an average.

When the comparative liquid crystal device was subjected to the liquid crystal movement in the same manner as in Example 1, the device showed a large movement speed of 2.8 mm/hr at 25° C. as determined from the silicone oil movement speed.

When the comparative liquid crystal device was subjected to the X-ray diffraction analysis in the same manner as in Example 1, the liquid crystal in the comparative device exhibited a chevron structure (as represented by FIG. 12A) showing a smectic layer inclination angle δ of 11.5 deg., and the X-ray diffraction pattern was not changed at all as a result of the data signal application in the same manner as in Example 1.

EXAMPLE 2

Four blank device (panel) structures, two for the liquid crystal movement speed measurement and the remaining two for the X-ray diffraction analysis, were prepared in similar manners as in Example 1 except that the alignment films 8 and 9 were formed in the following manner.

For each device, the glass substrates 4 and 5 provided with transparent electrodes 6 and 7 were coated with a formic acid solution of 6,6-nylon, followed by drying and baking at 180° C. for 1 hour to form ca. 50 Å-thick alignment films 8 and 9. Then, the alignment films 8 and 9 were subjected to rubbing under the following conditions to form first and second substrates:

Rubbing cloth material: nylon
Roller diameter: 85 mm
Pressing depth: 0.35 mm
Roller revolution speed: 1000 rpm
Step feed rate: 20 mm/sec
Number of repetition: 1

For two devices (one including 1.1 mm-thick substrates and the other including 80 μm-thick substrates) among the four devices, the substrates were applied to each other so that the rubbing directions applied to the alignment films 8 and 9 were substantially parallel and identical to each other and, for the remaining two devices, the substrates were applied to each other so that the rubbing directions were substantially parallel and opposite to each other.

Each blank device was filled with a liquid crystal mixture heated to isotropic phase and comprising the compounds F–J used in Comparative Example in weight ratios of F/G/H/I/J=80.0/3.0/3.0/4.0/5.0.

The mixture liquid crystal showed the following phase transition temperatures and physical parameters:

Iso. $\xrightarrow{74.5°\ C.}$ SmA $\xrightarrow{43.5°\ C.}$ SmC* $\xrightarrow{2.1°\ C.}$ Crystal Title angle Ⓗ (at 30° C.)=26.7 deg.

Spontaneous polarization Ps (at 30° C.)=−26 (nC/cm²)

After the liquid crystal injection and cooling to 25° C., the devices were observed with respect to the alignment state in SmC* phase, whereby all the devices showed a good uniform alignment state and an apparent tilt angle θa of 22.3 deg. on an average.

When the two types of devices, one having parallel and identical rubbing directions and the other having parallel and opposite directions, were compared with each other, both types showed substantially identical uniaxial alignment characteristics but the latter type exhibited a slightly better alignment state as a tendency.

The two types of devices were subjected to the liquid crystal movement speed measurement at 20° C., 25° C., 30° C., 35° C. and 40° C. under the same drive conditions as in Example 1 and in the manner illustrated with reference to FIG. 3 by using silicone oil as a marker.

Figure 8:
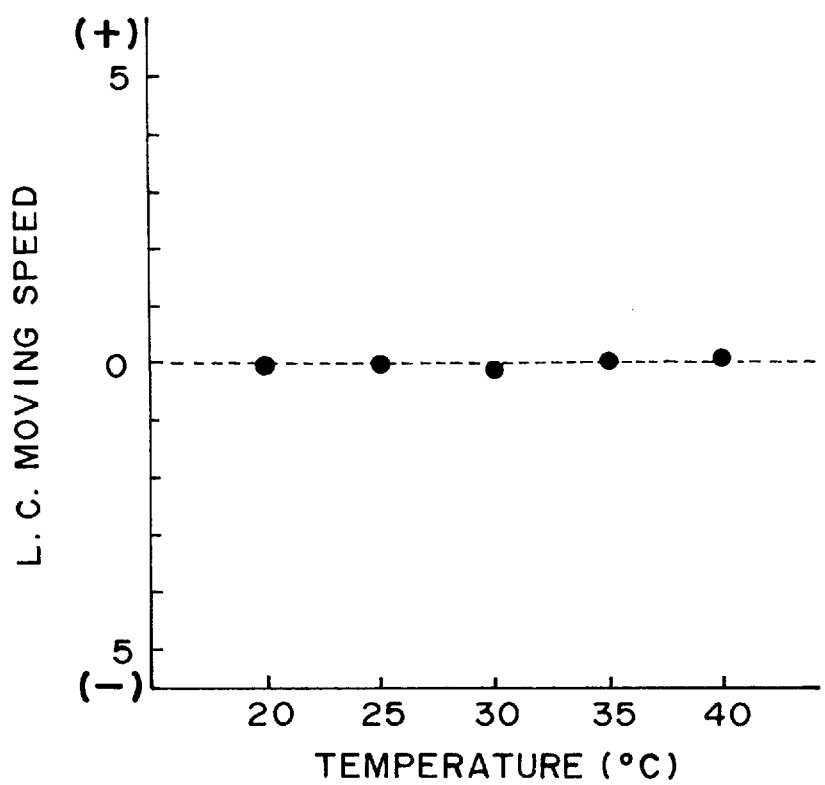

As a result, both types of devices showed a liquid crystal moving speed of substantially 0, thus showing substantially no liquid crystal movement, over a temperature range of 20°–40° C. FIG. 8 (wherein one scale represented "1 mm/hr") shows the measured results obtained with respect to the device having parallel and opposite rubbing directions on the substrates.

The two types of devices (each including 80 μm-thick glass substrates) were subjected to the X-ray diffraction analysis for analyzing liquid crystal layer structure before, during and after termination of, respectively, the application of data signals in the same manner as in Example 1.

As a result, each device showed a chevron structure including a layer inclination angle δ of ca. 4.5 deg. before the data signal application but exhibited a partial change into a bookshelf structure similarly as explained with reference to FIG. 7 in Example 1. Further, after the termination of the data signal application, each device exhibited an X-ray diffraction pattern substantially identical to that before the data signal application as described with reference to FIG. 7, thus indicating that the liquid crystal layer structure change into a bookshelf structure was a reversible one.

The two types of devices did not exhibit a remarkable difference regarding the layer structure changing characteristic.

After the drive, each device was observed with respect to alignment state at various temperatures in SmC* phase. As a result, each type of device showed no change in alignment state and a stable alignment state was confirmed.

As described above, the liquid crystal apparatus according to the present invention is so constituted that liquid crystal layer structure in the liquid crystal panel at least partially causes a reversible change into a bookshelf structure during drive including application of data signals, whereby the liquid crystal molecular movement and accompanying local change in liquid crystal layer thickness (gap) between the substrates during the drive can be suppressed, and good uniform alignment state can be realized without causing alignment deterioration due to temperature change.

Further, the liquid crystal display apparatus including the liquid crystal apparatus according to the present invention can effect a good display over the entire display area because the liquid crystal apparatus is constituted to exhibit good switching characteristic and cause no alignment deterioration due to temperature change.

What is claimed is:

1. A liquid crystal apparatus, comprising:

a liquid crystal panel including a pair of oppositely disposed substrates respectively having thereon a group of scanning electrodes for supplying a scanning signal and a group of data electrodes, intersecting the scanning electrodes, for supplying data signals so as to form an electrode matrix in combination, an alignment film disposed over the electrodes on at least one of the substrates, and a chiral smectic liquid crystal disposed between the substrates so as to form a pixel at each intersection of the scanning electrodes and the data electrodes;

said chiral smectic liquid crystal comprising a composition containing at least one species of fluorine-containing mesomorphic compound which has a structure including a fluorocarbon terminal portion and a hydrocarbon terminal portion connected by a central core and has a smectic phase or a latent smectic phase, said chiral smectic liquid crystal being composed of a plurality of liquid crystal layers each composed of a plurality of liquid crystal molecules, the liquid crystal molecules at each pixel being placed in an alignment state allowing a switching between a first state and a second state thereof upon application of an electric filed exceeding a switching threshold voltage; and drive means for sequently applying a scanning signal to the scanning electrodes so as to sequentially select the scanning electrodes and applying data signals to the data electrodes so as to cause a switching between the first and second states of liquid crystal molecules at a selected pixel on a selected scanning electrode;

the data signals applying to the liquid crystal at the pixels on non-selected scanning electrodes an electric field insufficient to cause the switching between the first and second states of the liquid crystal molecules but sufficient to cause a reversible change in shape of the liquid crystal layers from a structure including at least partially a chevron structure to a bookshelf structure.

2. A liquid crystal apparatus according to claim 1, wherein the alignment film disposed on at least one substrate has been subjected to a uniaxial aligning treatment.

3. A liquid crystal apparatus according to claim 2, wherein said uniaxial aligning treatment is rubbing.

4. A liquid crystal apparatus according to claim 1, wherein one substrate is provided with an alignment film subjected to a uniaxial aligning treatment, and the other substrate is provided with an alignment film not subjected to a uniaxial aligning treatment.

5. A liquid crystal apparatus according to claim 4, wherein said uniaxial aligning treatment is rubbing.

6. A liquid crystal apparatus according to claim 4, wherein said alignment film subjected to a uniaxial aligning treatment comprises a polyimide film.

7. A liquid crystal apparatus according to claim 1, wherein said pair of substrates are each provided with an alignment film subjected to a uniaxial aligning treatment.

8. A liquid crystal apparatus according to claim 7, wherein said uniaxial aligning treatment is rubbing.

9. A liquid crystal apparatus according to claim 8, wherein the alignment films on the pair of substrates have been subjected to rubbing in directions which are identical and substantially parallel to each other.

10. A liquid crystal apparatus according to claim 8, wherein the alignment films on the pair of substrates have been subjected to rubbing in directions which are opposite and substantially parallel to each other.

11. A liquid crystal apparatus according to claim 1, wherein said liquid crystal is placed in an alignment state showing at least two stable states and providing a tilt angle (H) and an apparent tilt angle θa satisfying: (H)>θa>(H)/2.

12. A liquid crystal apparatus according to claim 1, wherein said liquid crystal comprises a composition containing at least one species of compounds represented by the following formula (I):

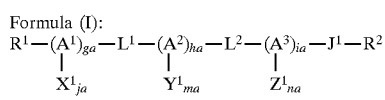

wherein $A^1$, $A^2$ and $A^3$ are each independently

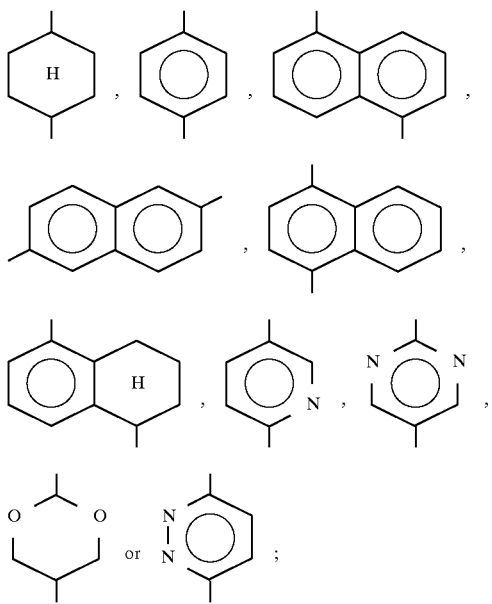

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH=N—, —N=CH—, —CH$_2$—O—, —O—CH$_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —OCH$_3$, —CH$_3$, —CN or —NO$_2$;

each ja, ma and na are independently an integer of 0–4;

$J^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 114 20, and pa is 0–4;

$R^1$ is —O—C$_{qa}$H$_{2qa}$—O—c$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{2qa}$—R$^3$, —CO—O—C$_{qa}$H$_{2qa}$—R$^3$, or —O—CO—C$_{qa}$H$_{2qa}$—R$^3$ which may be either straight chain or branched; where $R^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and qb are independently 1–20;

$R^2$ is C$_{xa}$F$_{2xa}$—X, where X is —H or —F, xa is an integer of 1–20.

13. A liquid crystal apparatus according to claim 1, wherein said liquid crystal comprises a composition containing at least one species of compounds represented by the following formula (I):

Formula (II):
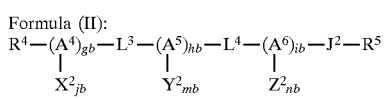

wherein $A^4$, $A^5$ and $A^6$ are each independently

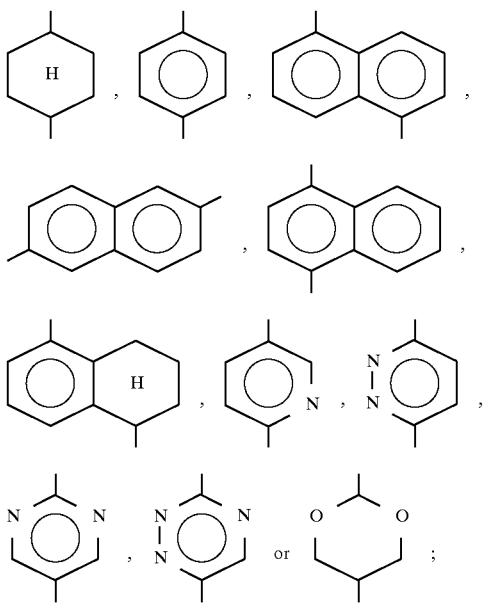

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$—(ka is 1–4), —CH=CH—, —C≡C—, —CH=N—, —N=CH—, —CH$_2$—O—, —O—CH$_2$—, —CO— or —O—;

$x^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; pb is 0–4;

$R^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; $R^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

14. A display apparatus, comprising:

a liquid crystal panel including a pair of oppositely disposed substrates respectively having thereon a group of scanning electrodes for supplying a scanning signal and a group of data electrodes, intersecting the scanning electrodes, for supplying data signals so as to form an electrode matrix in combination, an alignment film disposed over the electrodes on at least one of the substrates, and a chiral smectic liquid crystal disposed between the substrates so as to form a pixel at each intersection of the scanning electrodes and the data electrodes;

said chiral smectic liquid crystal comprising a composition containing at least one species of fluorine-containing mesomorphic compound which has a structure including a fluorocarbon terminal portion and a hydrocarbon terminal portion connected by a central core and has a smectic phase or a latent smectic phase, said chiral smectic liquid crystal being composed of a plurality of liquid crystal layers each composed of a plurality of liquid crystal molecules, the liquid crystal molecules at each pixel being placed in an alignment state allowing a switching between a first state and a second state thereof upon application of an electric filed exceeding a switching threshold voltage; and drive means for sequently applying a scanning signal to the scanning electrodes so as to sequentially select the scanning electrodes and applying data signals to the data electrodes so as to cause a switching between the first and second states of liquid crystal molecules at a selected pixel on a selected scanning electrode;

the data signals applying to the liquid crystal at the pixels on non-selected scanning electrodes an electric field insufficient to cause the switching between the first and second states of the liquid crystal molecules but sufficient to cause a reversible change in shape of the liquid crystal layers from a structure including at least partially a chevron structure to a bookshelf structure;

wherein said drive means includes:

a graphic controller for outputting graphic data and a scanning scheme signal, a scanning signal control circuit for outputting scanning address data and a scanning scheme signal, a data signal control circuit for outputting display data and a scanning scheme signal, a scanning signal application circuit for applying a scanning signal to the liquid crystal panel, and a data signal application circuit for applying data signals to the liquid crystal panel.

15. A liquid crystal apparatus according to claim 1, wherein each data signal is free from a pause period exceeding a switching unit pulse period for determining the switching threshold voltage above which the liquid crystal molecules are switched between the first and second states.

16. A liquid crystal apparatus according to claim 15, wherein each data signal is free from a pause period exceeding a half the switching unit pulse period.

17. A liquid crystal apparatus according to claim 1, wherein the data signals have an amplitude in the range of approximately 15 to 80% of the switching threshold voltage.

* * * * *

UNITED STATES PATENT AND TRADEMARK OFFICE
CERTIFICATE OF CORRECTION

PATENT NO. : 5,863,458
DATED : January 26, 1999
INVENTOR(S) : HIROKATSU MIYATA, ET AL.        Page 1 of 3

It is certified that error appears in the above-identified patent and that said Letters Patent is hereby corrected as shown below:

On the title page

AT [56] REFERENCES CITED

OTHER PUBLICATIONS

Under Y. Ouchi et al., "No. 45," should read --No. 5,--.

COLUMN 2

Line 11, "a" should read --$\alpha$--;
Line 28, "6" should read --8--; and
Line 54, "designing." should read --design.--.

COLUMN 5

Line 52, "without" should read --without passing--.

COLUMN 6

Line 36, "al" should read --al.--.

COLUMN 7

Line 51, "$x^1$," should read --$X^1$,--.

COLUMN 8

Line 40, "—C—C—," should read -- —C≡C—,--;
Line 42, "—COor" should read -- —CO— or--;
Line 43, "$^2$," should read --$X^2$,--; and
Line 62, "114" should read --1 - --.

UNITED STATES PATENT AND TRADEMARK OFFICE
CERTIFICATE OF CORRECTION

PATENT NO. : 5,863,458

DATED : January 26, 1999

INVENTOR(S) : HIROKATSU MIYATA, ET AL.

It is certified that error appears in the above-identified patent and that said Letters Patent is hereby corrected as shown below:

COLUMN 9

Line 18, "is" should read --as--; and
Line 45, "(At))." should read --($\Delta$t)).--.

COLUMN 10

Line 15, "cause" should read --case--.

COLUMN 11

Line 13, "various-temperatures" should read --various temperatures--.

COLUMN 13

Line 51, "little" should read --few--.

COLUMN 16

Line 2, "little" should read --few--.

COLUMN 18

Line 8, "filed" should read --field--.

COLUMN 19

Line 46, "114" should read --1 - --; and
Line 61, "formula (I):" should read --formula (II):--.

UNITED STATES PATENT AND TRADEMARK OFFICE
CERTIFICATE OF CORRECTION

PATENT NO. : 5,863,458
DATED : January 26, 1999
INVENTOR(S) : HIROKATSU MIYATA, ET AL.

It is certified that error appears in the above-identified patent and that said Letters Patent is hereby corrected as shown below:

COLUMN 21

Line 15, "filed" should read --field--.

Signed and Sealed this

Twenty-first Day of December, 1999

Attest:

Q. TODD DICKINSON

Attesting Officer

Acting Commissioner of Patents and Trademarks